(12) United States Patent
Tanaka

(10) Patent No.: US 6,385,654 B1
(45) Date of Patent: May 7, 2002

(54) FILE TRANSFERRING APPARATUS AND METHOD THEREOF

(75) Inventor: Satoshi Tanaka, Zama (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/178,465

(22) Filed: Oct. 23, 1998

(30) Foreign Application Priority Data

Oct. 23, 1997 (JP) .............................................. 9-291070

(51) Int. Cl.7 .............................................. G06F 15/16
(52) U.S. Cl. ....................... 709/231; 709/217; 709/232; 709/216
(58) Field of Search ................................. 345/340, 349, 345/329; 709/211, 217, 218, 219, 232, 223, 213, 216, 231

(56) References Cited

U.S. PATENT DOCUMENTS 5,714,971 A * 2/1998 Shalit et al. ................. 345/340
5,801,700 A * 9/1998 Ferguson .................... 345/349
5,987,510 A * 11/1999 Imai et al. ................... 709/219
6,049,892 A * 4/2000 Casagrande et al. .......... 714/18

OTHER PUBLICATIONS

Sean Cafferky, Network 97: Oct: Web Development "Review: WSFTP", http://www.ppn.org/ net97/oct/, 3 pp.*
Carole Leita, Using WS–FTP for Transferring Files, http://www.atlantic.edu/dac/tips/wsftp.html, Oct 1997, 6 pp.*
Mike Avery, "WSFTP makes downloads painless", http://www.infoworld.com/, Mar. 1998, 3 pp.*
Joyce Kohl, "File Transferring With WSFTP Pro 5", http://goinside.com/98/4/wsftp.html, Apr. 1998, 6 pp.*
Ipswitch, Inc., WSFTP Pro: User's Guide Software Version 5, Feb. 1998, 104 pp.*

* cited by examiner

Primary Examiner—Ayaz Sheikh
Assistant Examiner—Patrice Winder
(74) Attorney, Agent, or Firm—Ronald L. Drumheller

(57) ABSTRACT

A user's burden is decreased when transferring a file via a network by simplifying the directory changing operation at each node. FTP-C-S/W 114 displays a current directory and a directory/file included therein of a local node and a remote node in a GUI panel. When the user clicks any one of the displayed directories with a mouse, the FTP-C-S/W 114 accepts the clicked directory as a directory specified by the user and selects it as a new current directory in place of the existing current directory. When a current directory of the local node is newly selected, the FTP-C-S/W 114 automatically selects a directory of the remote node corresponding to the new current directory of the local node and makes it a new current directory of the remote node to have both current directories coincide.

9 Claims, 9 Drawing Sheets

S200

S220

S240

S260

FILE TRANSFERRING APPARATUS AND METHOD THEREOF

BACKGROUND OF THE INVENTION

1. Field of the Invention

This invention relates to a file transferring apparatus and method thereof for transferring an arbitrary file of an arbitrary directory of an arbitrary communication node between communication nodes using a communication protocol such as FTP in a network system comprising a plurality of communication nodes which store respective files in correlation to directories.

2. Related Art

A technology of transferring a file containing data between communication nodes comprising a network system using, for example, FTP (file transfer protocol) has been used in the art.

For example, PUPA 63-282867, PUPA3-251935, PUPA4-340140, PUPA7-49818, PUPA7-244617 and PUPA7-248954 disclose a technology of transferring a file between communication nodes.

The file transfer operation between such communication nodes is performed for each transfer of a file by the following procedure.

First of all, a user performs an operation to make the current directory of the communication node which the user operates (local node) to be a directory containing a file to be sent to a communication node (remote node) which communicates with the local node or a directory storing a file received from the remote node.

Next, the user performs an operation to make the current directory of the remote node to be a directory containing a file requested for sending to the local node or a directory storing a file sent from the local node.

The user then performs an operation to specify a file stored in the current directory of the remote node for sending it to the local node and have the local node receive it, or an operation to specify a file stored in the current directory of the local node for sending it to the remote node and have the remote node receive it.

When a home page is opened on the internet, it is necessary to send various types of files including an HTML (hyper text markup language) document file, an image data file, CGI (common gateway interface) file and a Java applet to a server device. Because these files are often controlled by being sorted into directories corresponding to the types in the sever device, the user has to change directories of both the local and the remote nodes each time a file is sent. In the file transfer method shown as a prior art technology, such operation was performed by specifying the directory by users manual input using a keyboard. The operation to change the directory by such manual input is very cumbersome and burdensome to the user.

SUMMARY OF THE INVENTION

This invention was conceived in view of the above described problems of the prior art and it is an object of the invention to provide a file transferring apparatus and method thereof which simplifies the operation to change directories of each node in transferring a file to reduce the burden of the user.

It is also an object of this invention to provide a file transferring apparatus and method thereof which allow a directory of each node required for file transfer to be changed by users simple operation on a GUI panel and further allow, when the directory of a local node is changed, the directory of a remote node corresponding to the changed directory of the local node to be automatically selected and, conversely, when the directory of a remote node is changed allow the directory of a local node corresponding to the changed directory of the remote node to be automatically selected.

In order to achieve the above objects, this invention provides a file transferring apparatus in one or more of a plurality of communication nodes interconnected each other (local node) for transferring a file containing data between said local node and another communication node communicating with said local node (remote node), in which each of said communication nodes correlates each of one or more directories configured in a hierarchical structure to at least a directory and/or a file of a lower hierarchy (lower directory), and said remote node at least notifies at least said local node of the directory of said remote node, comprising; first current directory selecting means for selecting either one of the directories of said local nodes (local directory) or either one of said notified directories of the remote node (remote directory) as a local current directory or a remote current directory, second current directory selecting means for selecting said remote directory corresponding to said selected local current directory or said local directory corresponding to said selected remote directory as said remote current directory or said local current directory, and file transfer means for transferring a file by sending a file correlated to said local current directory to said remote node and/or receiving a file correlated to said remote current directory from said remote node.

Preferably, the file transferring apparatus further comprises directory display means for displaying at least said selected local current directory and said selected remote current directory and/or said lower directory and a directory of higher hierarchy (higher directory) of said selected local current directory and said selected remote current directory, directory designation accepting means for accepting designation of said lower directory or said higher directory of said local current directory and said remote current directory, said first current directory selecting means selecting said lower directory or said higher directory of said local current directory and said remote current directory as a new local current directory and a new remote current directory, and said second current directory selecting means selecting said remote current directory or said local current directory corresponding to said newly selected local current directory or said newly selected remote current directory as said new remote current directory or said new local current directory each time said local current directory or said remote current directory is newly selected.

Preferably, said remote node notifies upon request said local node of said lower directory and/or said higher directory of said remote current directory, said first current directory selecting means and said second current directory selecting means request said remote node to notify of said lower directory and/or said higher directory of said newly selected remote current directory, and said directory display means displays said lower directory and/or said higher directory of said selected local current directory and said lower directory and/or said higher directory of said remote current directory notified from said remote node in response to the request.

Preferably, at least each of said remote nodes notifies at least said local node of the directory name of said remote directory, said second current directory selecting means selects said remote directory or said local directory of the same directory name as said local current directory or said remote current directory as said remote current director or said local current directory.

The file transferring apparatus of this invention transfers between any communication nodes a file containing data by FTP (file transfer protocol) in any communication node of a communication network which is so configured that a plurality of communication nodes can transfer data over a communication network.

Each of a plurality of communication nodes comprising the communication network controls a file recorded in a hard disk, etc., by using a register for file control which is referred to as a directory structured in a hierarchy. In this file control method using a directory, each directory is controlled in correlation to a higher directory when there is a higher directory in the hierarchical structure while each file is controlled in correlation to each directory.

Further, each communication node has a function of notifying a communication node now in communication of directory information indicating the name of a lower directory correlated to each directory and a file according to a communication protocol such as FTP in response to a request.

When a file or a lower directory is managed by being correlated to a higher directory, this is also stated that "a directory B and a file B exist (is included, or stored) in a directory A" according to a convention.

An arbitrary communication node in a communication network in which a user performs a file transfer operation is also referred to as a local node.

Further, an arbitrary communication node in a communication network performing file transfer with a local node (regardless of whether or not it is provided with a file transferring apparatus) is also referred to as a remote node.

A directory which a user selects for file transfer is also referred to as a current directory.

An arbitrary directory of a local node is also referred to as a local directory while a current directory of a local node is also referred to as a local current directory.

An arbitrary directory of a remote node is also referred to as a remote directory while a current directory of a remote node is also referred to as a remote current directory.

In the file transferring apparatus of this invention, the directory display means receives information of the local current directory selected by the first current directory selecting means and the second current directory selecting means from an operation system (OS) of the local communication node for example, and displays a lower directory, a file and a higher directory of the local current directory included in the local current directory in the window of GUI panel displayed in a monitor device of the local node.

Further, the directory display means displays a lower directory, a file and a higher directory of the remote current directory which the remote node notified and the file transferring apparatus received in the window of GUI panel in response to a request by the first current directory selecting means and the second current directory selecting means via the file transferring apparatus.

When a user designates a lower directory or a higher directory of a local current directory displayed in the window of GUI panel using a pointing device such as a mouse, for example, the directory designation accepting means accepts this designation and notifies the first current directory selecting means of this.

Further, when the user designates a lower directory or a higher directory in the remote current directory in the window of GUI panel, the directory designation accepting means accepts this designation and notifies the first current directory selecting means of this.

The first current directory selecting means, in response to a users operation to change the local current directory, issues a command to the OS of the local node so as to select the local directory notified by the directory designation accepting means as a new local current directory.

Further, the first current directory selecting means selects the remote directory notified by the directory designation accepting means as a new remote current directory and requests the remote node to notify the directory information of the new remote current directory via the file transfer means.

When the first current directory selecting means selects a new local current directory, the second current directory selecting means selects, for example, a remote directory of the same name as the new local current directory as a new remote current directory to synchronize the local current directory with the remote current directory. Further, the second current directory selecting means requests the remote node to notify directory information of the new remote current directory via the file transfer means.

In addition, when the first current directory selecting means selects a new remote current directory, the second current directory selecting means issues a command to the OS of the local node so as to select a local directory of the same name as the new remote current directory as a new local current directory to synchronize the local current directory with the remote current directory.

The file transfer means is a communication software to effect file transfer by FTP and, in response to users operation, transfers a file included in the local current directory selected by the first current directory selecting means or the second current directory selecting means to the remote node via the communication network to have it stored in the remote current directory and, conversely, requests the remote node to transfer a file included in the remote current directory, receives the file transferred in response to the request and stores it in the local directory.

The file transfer means, in response to a request by the first current directory selecting means and the second current directory selecting means, requests the remote node to notify directory information of the remote current directory and supplies the directory information notified in response to the request to the directory display means.

This invention also provides a file transferring method in one or more of a plurality of communication nodes interconnected each other (local node) for transferring a file containing data between said local node and another communication node communicating with said local node (remote node), in which each of said communication nodes correlates each of one or more directories configured in a hierarchical structure to at least a directory and a file of a lower hierarchy (lower directory) or either one of the directory and the file, and said remote node at least notifies at least said local node of the directory of said remote node, comprising the steps of; selecting either one of the directories of said local nodes (local directory) or either one of said notified directories of the remote node (remote directory) as a local current directory or a remote current directory, selecting said remote directory corresponding to said selected local current directory or said local directory corresponding to said selected remote directory as said remote current directory or said local current directory, and transferring a file by sending a file correlated to said local current directory to said remote node and/or receiving a file correlated to said remote current directory from said remote node.

Further, this invention provides a computer readable recording medium for use in a file transferring apparatus for transferring a file containing data between one or more of a plurality of communication nodes interconnected each other (local node) and another communication node communicating with said local node (remote node) in which each of said communication nodes correlates each of one or more directories configured in a hierarchical structure to at least a directory of a lower hierarchy (lower directory) and/or a file, and said remote node at least notifies at least said local node of the directory of said remote node, said recording medium recording a program for causing a computer to execute; first current directory selecting step for selecting either one of the directories of said local nodes (local directory) or either one of said notified directories of the remote node (remote directory) as a local current directory or a remote current directory, second current directory selecting step for selecting said remote directory corresponding to said selected local current directory or said local directory corresponding to said selected remote directory as said remote current directory or said local current directory, and file transfer step for transferring a file by sending a file correlated to said local current directory to said remote node and/or receiving a file correlated to said remote current directory from said remote node.

DESCRIPTION OF THE PREFERRED EMBODIMENTS

A mode of practicing this invention is now described hereunder.

Communication Network

Figure 1:
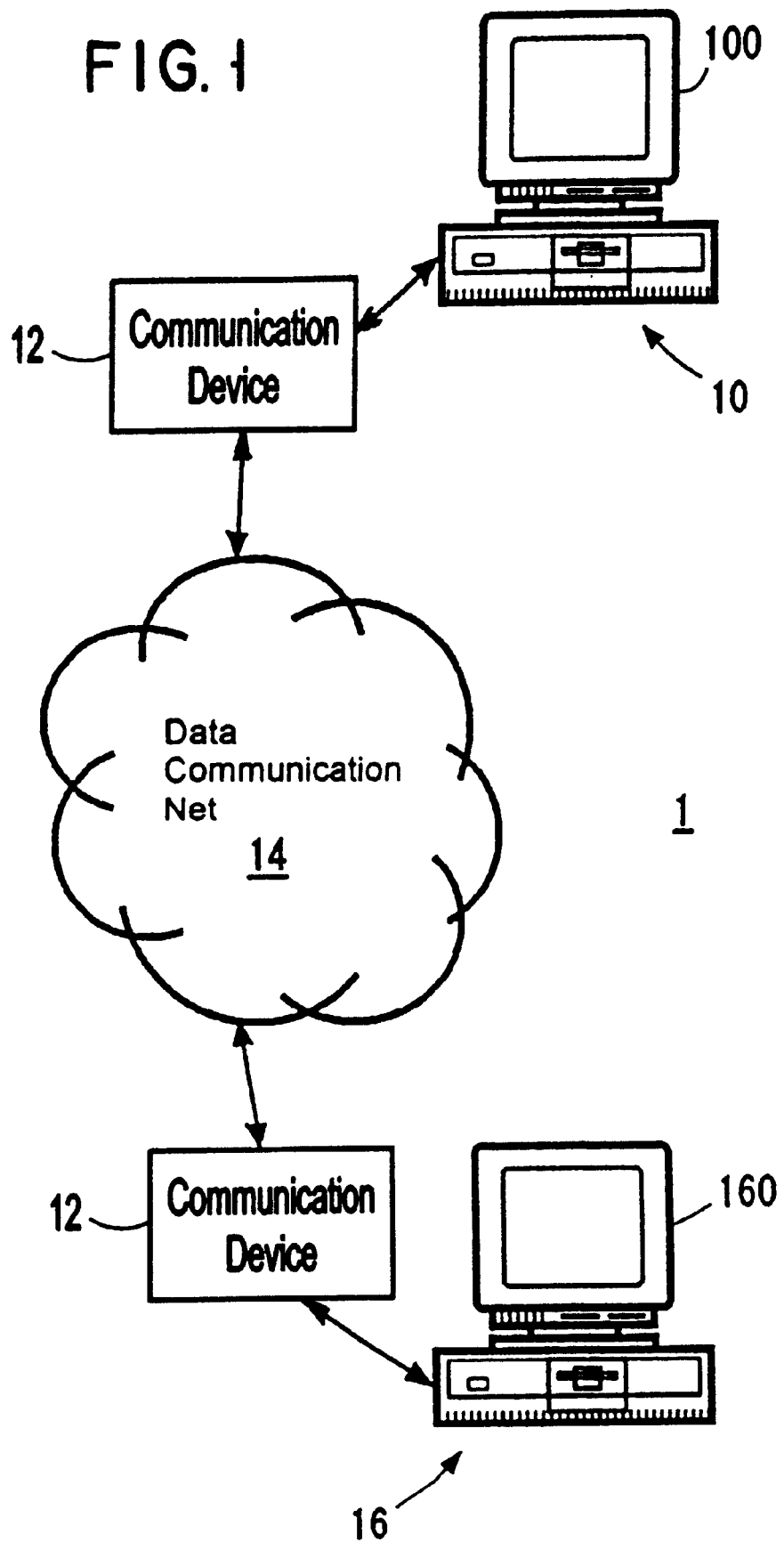
FIG. 1 is a diagram showing an example of a configuration of a communication network to which the file transferring method of this invention is applied.

FIG. 1 is a diagram showing a configuration of a communication network 1 to which the file transferring method of this invention is applied.

As shown in FIG. 1, the communication network 1 comprises a data communication net 14 and n (n is an integer) communication nodes (FIG. 1 shows an example where n=2). A communication node operated by a user who transfers a file is referred to as a local node 10 while any node transferring a file between itself and the local node 10 is referred to as a remote node 16.

Data Communication Net 14

The data communication net 14 which is a LAN (local area network), a leased data communication net or a public communication net which is capable of data communication transfers data between the local node 10 and the remote node 16.

Local Node 10

The local node 10 comprises a computer 100 and a communication device 12. Components of the local node 10 are described hereunder.

Communication Device 12

The communication device 12 is, for example, a LAN adapter, a TA (terminal adapter) or a modem and, in the local node, receives data transmitted from the remote node 16 side via the data communication net 14 for output to the computer 100.

Also, the communication device 12 transmits data inputted from the computer 100 to the remote node 16 via the communication net 14.

Computer 100

Figure 2:
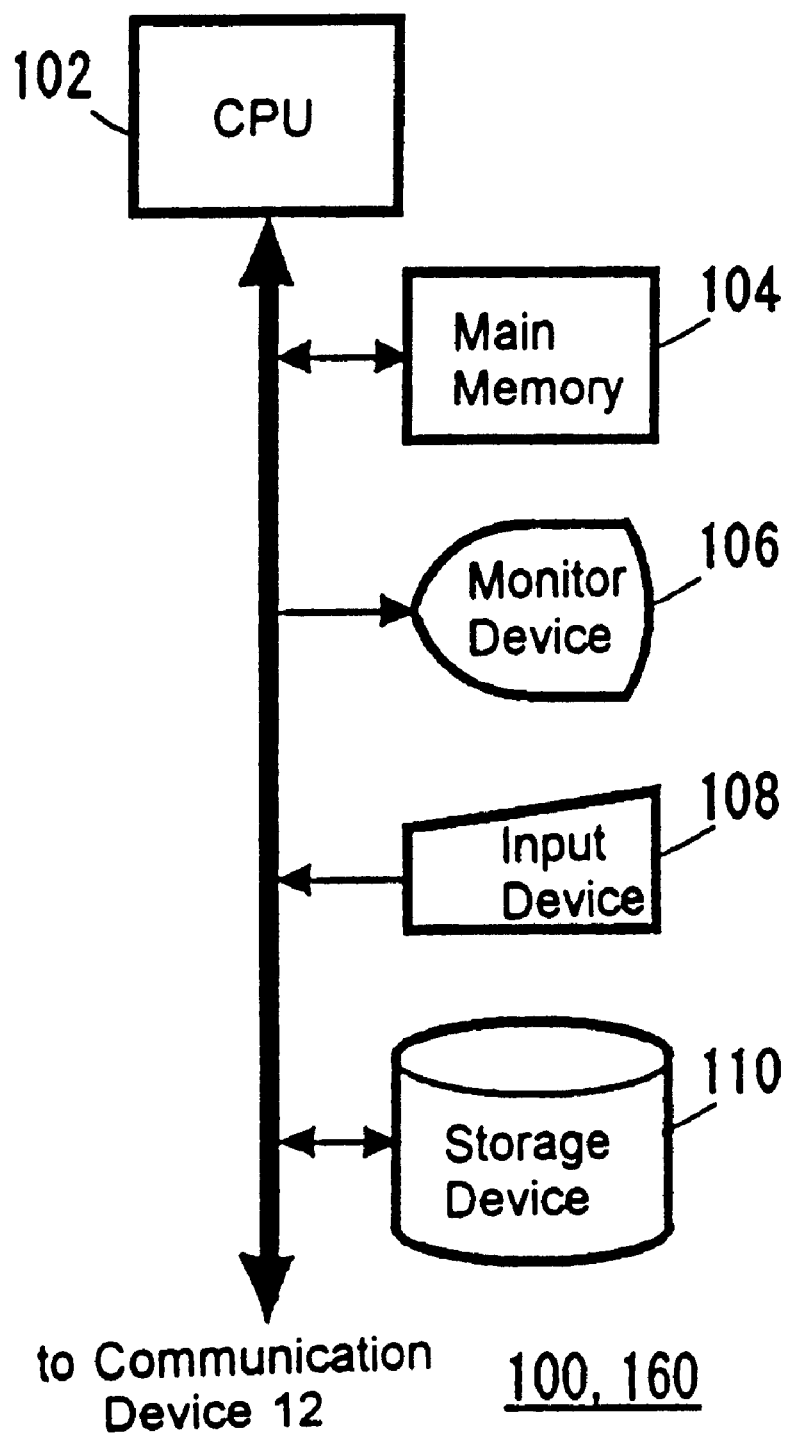
FIG. 2 is a diagram showing an example of a hardware configuration of a computer shown in FIG. 1.

FIG. 2 is a diagram showing a hardware configuration of computers 100 and 160 shown in FIG. 1.

The computer 100 comprises, for example, a CPU 102 including a general purpose CPU and its peripheral circuits, a main memory 104, a monitor device 106, an input device 108 and a storage device 110.

Main Memory 104

In the computer 100, the main memory 104 stores a program executed by the CPU 102 and data required for processing by the program.

Monitor Device 106

The monitor device 106 displays a GUI panel, etc., which is generated by the CPU 102 and used in the operation to transfer a file.

Input Device 108

The input device 108 includes a pointing device such as a mouse and a keyboard and receives users operation for output to the CPU 102.

Storage Device 110

The storage device 110 which is a non-volatile storage device such as a hard disk device or a magneto-optic disk (MO) device operates under the control of the operation system (OS, FIG. 3) of the computer 100 and stores a file to be transferred to the remote node 16 and a file transferred from the remote node 16.

Software Processing in Computer 100

Figure 3:
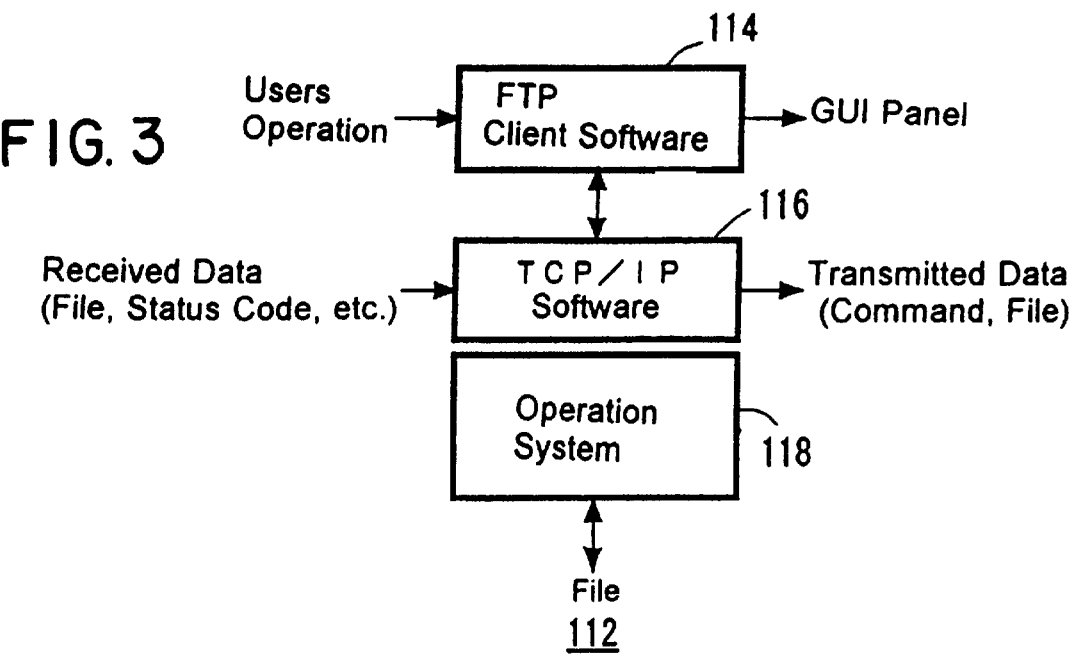
FIG. 3 is a diagram showing an example of a configuration of a software executed in the local node.

FIG. 3 is a diagram showing a configuration of a software 112 executed in the local node 10.

In the storage device 110 of the computer 100, an operation system 118 such as OS/2 (trademark of IBM), MS-DOS and Windows (trademark of Microsoft) supporting a FTP client software 114, a TCP/IP software 116 and TCP/IP is stored beside a file to be transferred. The CPU 102 loads these softwares stored in the storage device 110 to the main memory 104 for execution to perform each processing given hereunder.

Processing of Operation System 118
File Control Processing

The operation system 118 performs processing common to an operating system including execution of a program stored in the storage device 110, etc., in the computer 100. In addition, as processing peculiar to this invention, the operation system 118 controls a file stored in the storage device 110 in correlation to a directory of hierarchical structure and, in response to a command issued by a FTP client software 114 and a TCP/IP software 116, stores a file inputted from the TCP/IP software 116 and outputs the stored file to the storage device 110 for storage therein.

Display Processing of Current Directory

In the computer 100, the FTP client software 114 displays a directory file included in the local current directory and the remote current directory, and a higher directory of the current directory in the window of a GUI (graphic user interface) displayed in the monitor device 106.

Designation Processing of Current Directory

Also, when the user clicks with a mouse of the input device 108 either one of the local current directory displayed in the window of the GUI panel and the directory included in the remote current directory, for example, the FTP client software 114 accepts the clicked local directory or the remote directory as a directory specified by the user.

File Designating Processing

When the user clicks by a mouse either the local current directory displayed in the window of the GUI panel or a file included in the remote current directory, for example, the FTP client software 114 accepts the clicked file as a file specified by the user.

Current Directory Selection Processing

Also, the FTP client software 114 selects the directory specified by the user as a new local current directory or a remote current directory in place of the old local current directory or remote current directory before designation was made.

Current Directory Synchronization Processing

When a local current directory or a remote current directory is newly selected and there exists a remote directory or a local directory of the same name as the newly selected local current directory or a remote current directory, the FTP client software 114 selects a directory of the same name or attribute, for example, as a directory corresponding to the newly selected current directory for synchronizing the current directory of the local node with the current directory of the remote node.

File Transfer Processing

In the computer 100, the TCP/IP software 116 stores a file which is specified by the user and transferred from the remote node 16 side via the data communication net 14 and the communication device 12 in the local current directory specified by the user and, conversely, transmits a file included in the local current directory specified by the user to the remote node 16 side via the communication device 12 and the data communication net 14 to have it stored in the remote current directory of the remote node 16. The TCP/IP software 116 also performs control processing for the communication device 12.

Remote Node

The remote node 16 comprises a computer 160 and the communication device 12. The components of the remote node 16 are now described hereunder.

Communication Device 12

The communication device 12 of the remote node 16 is a device similar to the communication device 12 of the local node 10 and receives data transmitted from the local node 10 side via the data communication net 14 in the remote node 16 for output to the computer 160.

The communication device 12 also transmits data inputted from the computer 160 to the local node 10 side via the data communication net 14.

Computer 160

The computer 160 is of the same configuration as the computer 100 in a hardware aspect with only the content of executed software being different.

Software Processing in Computer 160

Figure 4:
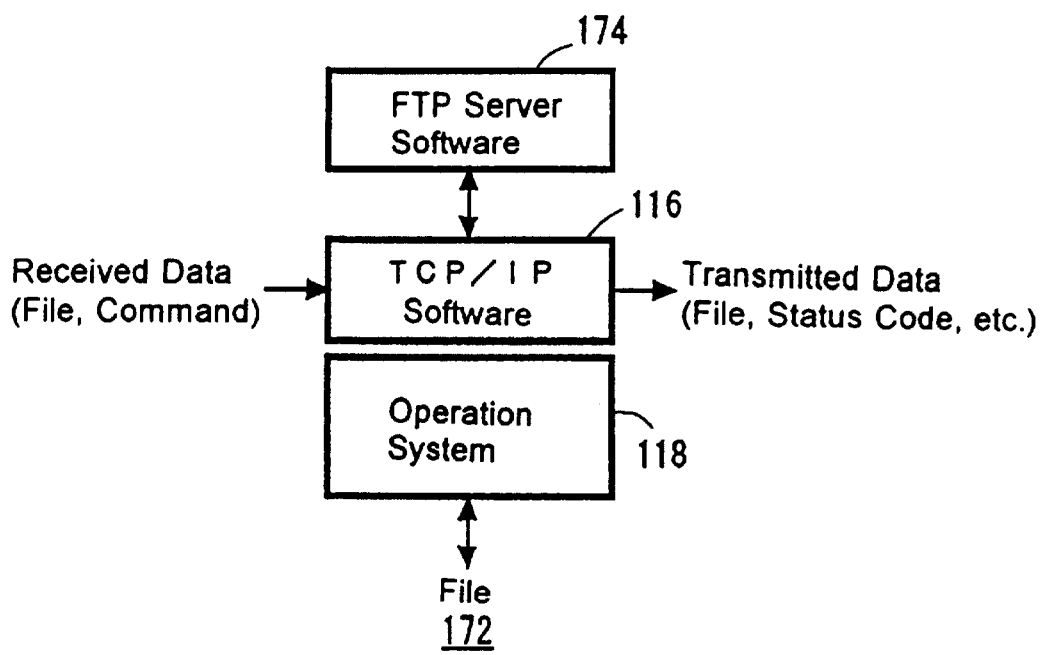
FIG. 4 is a diagram showing an example of a configuration of a software executed in the remote node.

FIG. 4 is a diagram showing the configuration of a software 172 executed in the remote computer 160.

An FTP server software 174, TCP/IP software 116 and an operation system 118 are stored in the storage device 110 of the computer 160. The CPU 102 of the computer 160 loads these softwares stored in the storage device 110 into the main memory 104 for execution to perform each processing shown below. Incidentally, in the computer 160 also, the content of the operation system 118 is same as the computer 100.

Processing of FTP Server Software

The FTP server software 174 is not required to perform the same processing as the FTP client software 114 (FIG. 3) but performs at least the current directory selection processing as shown blow.

Current Directory Selection Processing

The FTP server software 174 selects a remote directory selected by the FTP client software 114 of the local node 10 and notified to the remote node 16 side as a new remote current directory in place of the old remote current directory before designation was made.

Processing of TCP/IP Software 116

File Transfer Processing

In the remote node 16 side, the TCP/IP software 116 stores a file transferred from the local node 10 side via the data communication net 14 and the communication device 12 by FTP, for example, in a selected remote directory in the manner similar to the computer 100 and, conversely, transmits a file included in the remote current directory to the local node 10 side via the communication device 12 and the data communication net 14 in response to a request from the local node 01 side for storage in the remote current directory of the local node 10. Incidentally, the TCP/IP software 116 also performs control processing of the communication device 12 as done in the local node.

Operation of Communication Network 1

The operation of the communication network 1 is now described hereunder with reference to FIG. 5 to FIG. 12.

Figure 5:
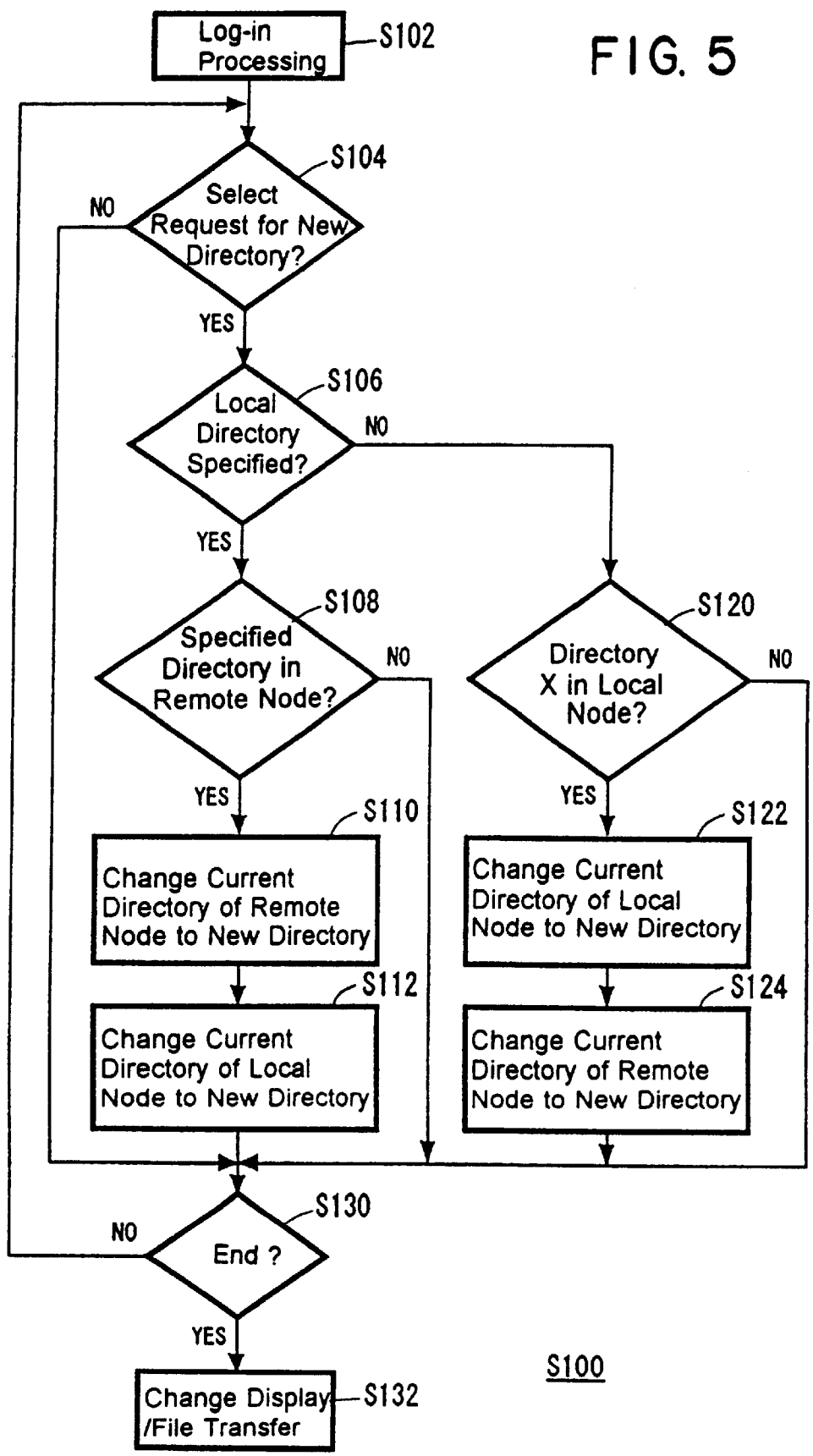
FIG. 5 is a flow chart showing current directory selection processing and current directory synchronization processing (S100) in the local node shown in FIG. 1, etc.

FIG. 5 is a flow chart showing current directory selection processing and current directory synchronization processing (S100) in the local node 10 as shown in FIG. 1.

Figure 6:
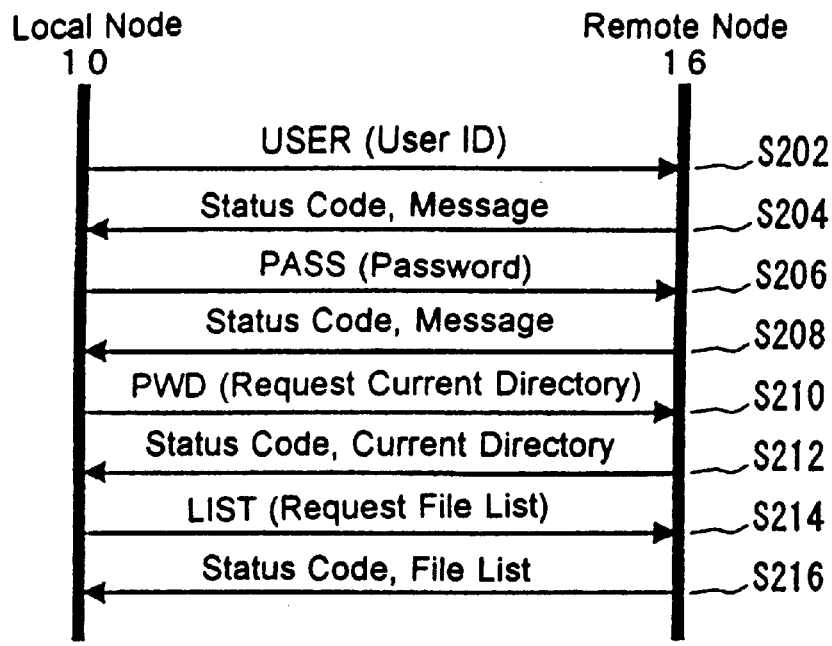
FIG. 6 is a communication sequence diagram showing log-in processing which the local node performs to the remote node.

FIG. 6 is a communication sequence diagram showing log-in processing (S200) which the local node shown in FIG. 1 performs with respect to the remote node 16.

Log-in Processing

When the user of the local node 10 performs an operation to log-in the remote node 16 to the input device 108 (FIG. 2) of the computer 100, the FTP client software 114 (FIG. 3) begins the log-in processing in step (S102) as shown in FIG. 5.

The FTP client software 114 controls the TCP/IP software 116 to have a USER command including a user ID inputted by the user sent to the remote node 16 side via the communication device 12 and the data communication net 14 (FIG. 6, S202).

In the computer 160 of the remote node 16, the FTP server software 174, upon receiving the USER command via the TCP/IP software 116, controls the TCP/IP software 116 to have a status code and a message (331 Password required for satoshi, for example) sent to the local node 10 side via the communication device 12 and the data communication net 14 (FIG. 6, S204).

The FTP client software 114, upon receiving the status code and the message returned from the remote node 16 side, displays them in the monitor device 106 and transmits a PASS (password) inputted by the user to the remote node 16 side (FIG. 6, S206).

The FTP server software 174, upon receiving the PASS from the local node 10 side, transmits a status code and a message (230 User satoshi logged in, for example) to the local node 10 side (FIG. 6, S208).

The FTP client software 114 of the local node 10 side, upon receiving the status code and the message returned from the remote node 16 side, displays them in the monitor device 106, transmits a PWD command to the remote node 16 side and requests to transmit the current directory (remote current directory) of the computer 160 (FIG. 6, S210).

The FTP client software 114 of the remote node 16 side, upon receiving the PWD command from the local node 10 side, acquires directory information including a status code and the name of the remote current directory (257 "httpd/user_loot/home/satoshi/public_html" is current directory, for example.) from the operation system 118 and sends it to the local node 10 side (FIG. 6, S212).

The FTP client software 114 of the local node 10 side, upon receiving the status code and directory information of the current directory returned from the remote node 16 side, displays them in the monitor device 106, transmits a LIST command to the remote node 16 side and requests to transmit information including all files included in the remote current directory and the name of a lower directory (simply referred to as "file information" hereinafter) (FIG. 6, S214).

The FTP server software 174 of the remote node 16 side, upon receiving the LIST command from the local node 10 side, acquires a status code and file information of the remote current directory from the operation system 118 and transmits them to the local node 10 side (FIG. 6, S216).

Figure 7:
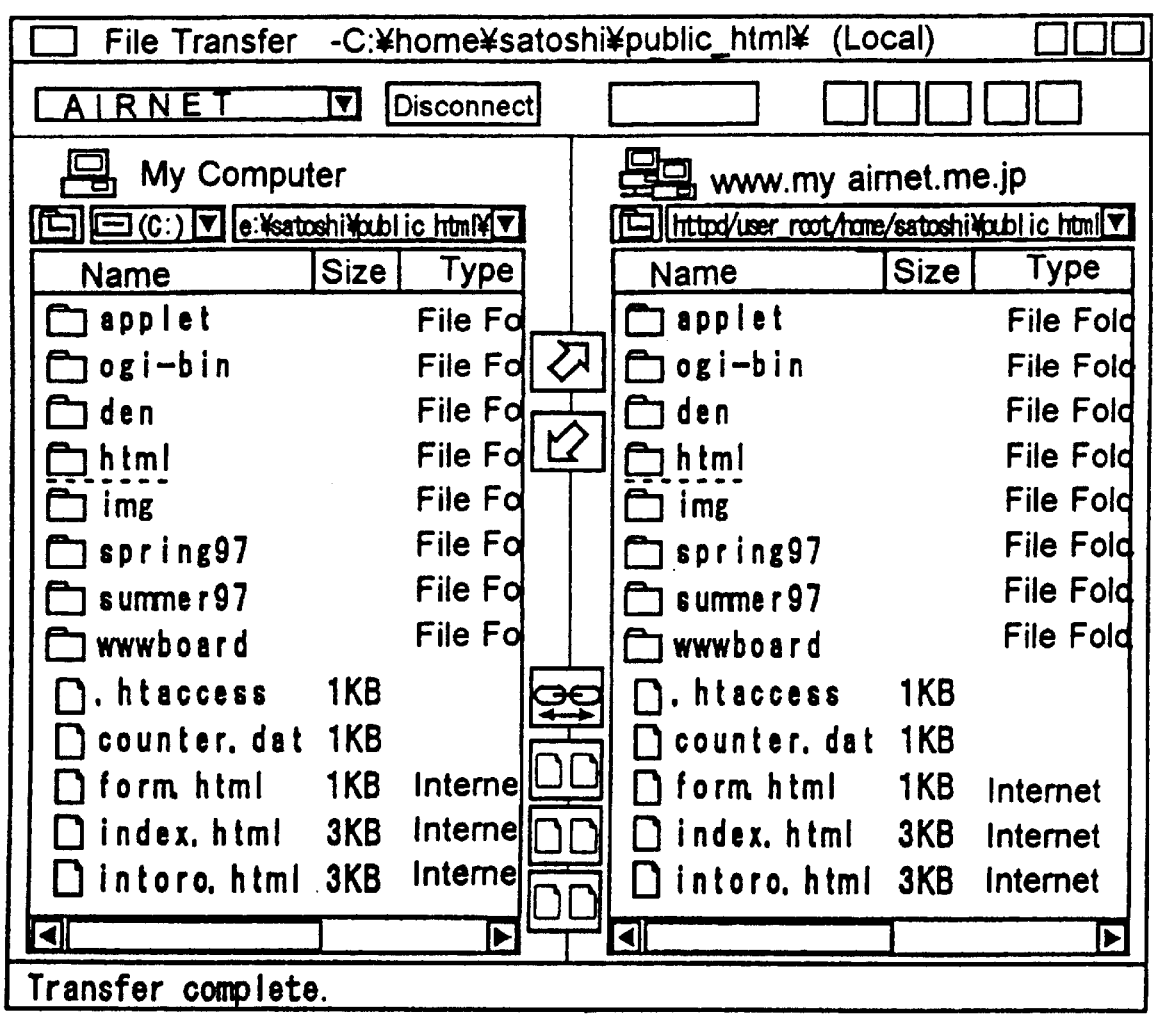
FIG. 7 is a diagram showing an example of a GUI panel displayed in the monitor device (FIG. 2) of the local node after the log-in processing shown in FIG. 6 is done.

FIG. 7 is a diagram showing a GUI panel displayed in the monitor 106 (FIG. 2) of the local node 10 after the log-in processing shown in FIG. 6 is completed.

When the log-in is completed, the FTP client software 114 of the local node 10 side displays directory information and file information of the current directory of the local node 10 side (local current directory) in the left side window (my computer) of the GUI panel shown in FIG. 7 and displays directory information and file information of the current directory of the remote node 16 side in the right side window of the GUI panel (www.ny.airnet.ne.jp) (this corresponds to the above described current directory display processing).

In step (S104) shown in FIG. 5, when the user performs a pointing operation to the GUI panel shown in FIG. 7 by a mouse of the input device 108, the FTP client software 114 of the local node 10 side determines whether or not the user points the directory name displayed in the window of the GUI panel.

When the directory name is pointed, the FTP client software 114 determines that the user has requested to select a new directory and accepts the directory of the name pointed as a directory specified by the user, proceeding to the processing in S106 (this corresponds to the above described current directory designating processing), while proceeding to processing in S130 otherwise.

In step 106 (S106), the FTP client software 114 determines whether or not the user specified a directory (local directory) of the local node 10 side in the window. When the local directory ("html" in the right window in FIG. 7, for example) is specified, the FTP client software 114 proceeds to processing in S108 while it proceeds to processing in S120 otherwise.

Figure 8:
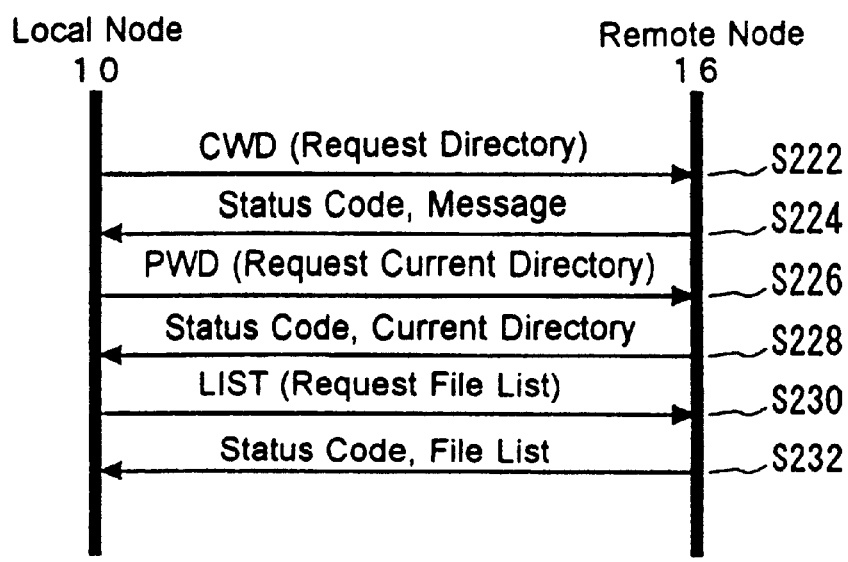
FIG. 8 is a communication sequence diagram showing the current directory selection processing and the current directory synchronization processing (S220) shown in FIG. 5.

FIG. 8 is a communication sequence diagram showing the current directory selection processing and the current directory synchronization processing (S220) shown in FIG. 5.

In step 108 (S108), the FTP client software 114 determines whether or not a remote directory of a same name or attribute as the specified local directory actually exists in the remote node 16 side and proceeds to processing in S130 when it does not exist while it proceeds to processing in S110 otherwise.

In step (S110), the FTP client software 114 in the local node 10 side sends to the remote node 16 side a CWD command which includes a directory name of the remote directory of the same name or attribute as the specified local directory and requests the remote node 16 side to change the current directory to have the local current directory coincide the remote current directory (FIG. 8, S222).

When the FTP server software 174 in the remote node 16 side receives the CWD command from the local node 10 side, it selects a directory of the directory name included in the command and issues a command to the operation system 118 to make it a new current directory. The operation system 118 makes the selected directory a current directory according to the command from the FTP server software 174.

In addition, the FTP server software 174 returns a status code and a message (250 CWD command successful, for example) to the local node 10 side (FIG. 8, S224).

The FTP client software 114 of the local node 10 side sends a PWD command to the remote node 16 side in the manner similar to the log-in processing (FIG. 8, S226).

The FTP server software 174 in the remote node 16 side returns a status code and directory information to the local node 10 side in response to the PWD command from the local node 10 side (FIG. 8, S228).

When the FTP client software 114 of the local node 10 side receives the status code and the directory information returned from the remote node 16 side, it sends a LIST command to the remote node 16 side (FIG. 6, S230).

When the FTP client software 174 of the remote node 16 side receives the LIST command from the local node 10 side, it sends a status code and file information of the current directory to the local node 10 side (FIG. 8, S232).

In step 112 (S112), the FTP client software 114 of the local node 10 side selects a specified local directory and issues a command to the operation system 118 to make the selected local directory a new current directory of the local node 10 side. The operation system 118 makes the selected local directory a current directory in response to the command from the FTP client software 114.

In step 120 (S120), the FTP client software 114 of the local node 10 side determines whether or not the specified remote directory actually exists in the local node 10 side and proceeds to processing in S130 when it does not exist while it proceeds to S122 otherwise.

In step (S122), the FTP client software 114 of the local node 10 side selects the specified local directory and issues a command to the operation system 118 to make the selected local directory a new current directory of the local node 10 side. The operation system 118 makes the selected local directory a current directory in response to the command from the FTP client software 114.

In step 124 (S124), FTP client software 114 of the local node 10 side has the current directory of the remote node 16 side coincide the current directory of the local node 10 side as described with reference to FIG. 8, and acquires directory information and file information of the remote directory.

In step 130 (S130), FTP client software 114 of the local node 10 side determines whether or not the user performed an operation to end current directory selection processing and current directory synchronization processing and proceeds to processing in S132 when the user ends processing while it proceeds to processing in S104 otherwise.

Figure 9:
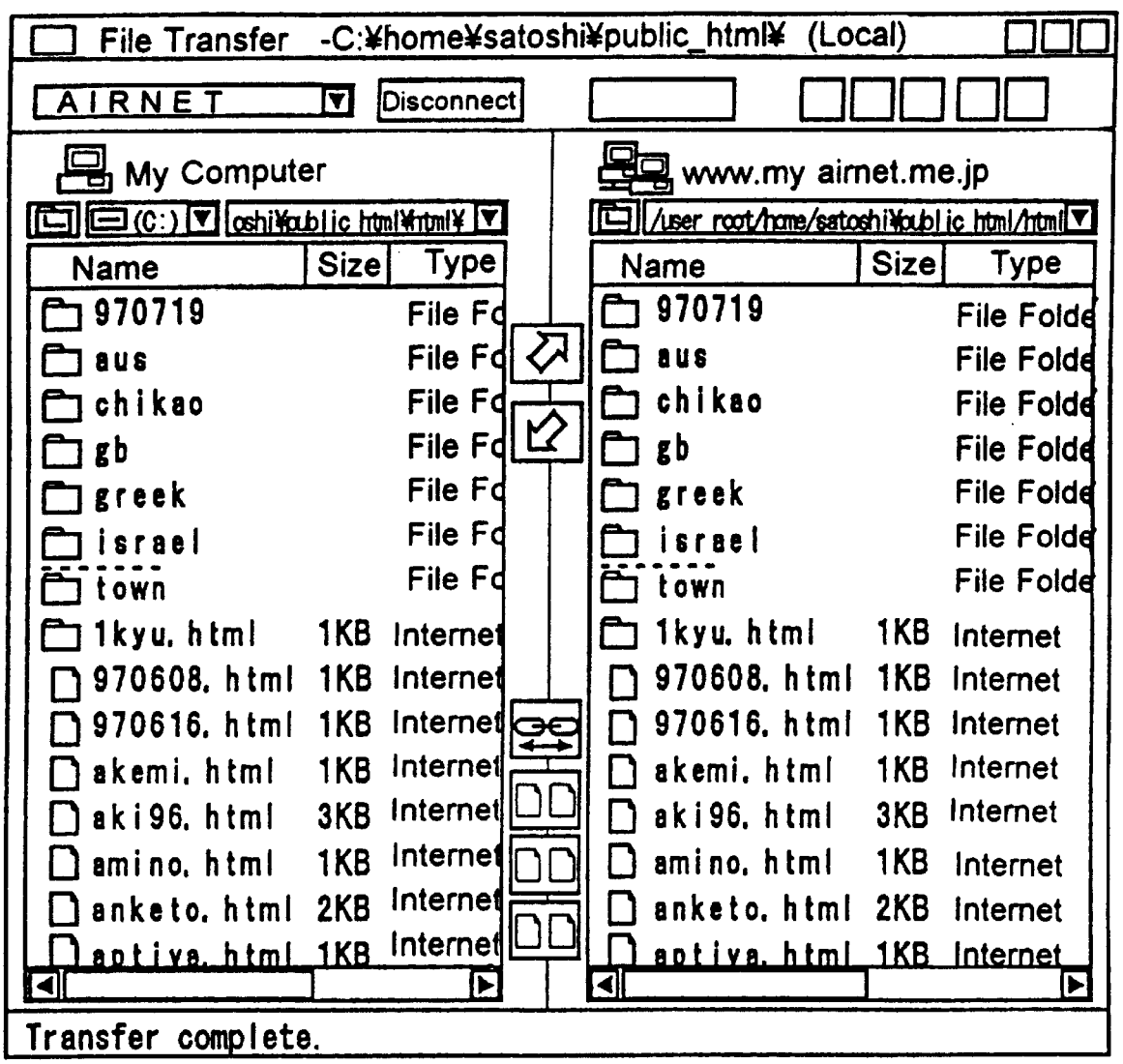
FIG. 9 is a first diagram showing a GUI panel displayed in the monitor (FIG. 2) of the local node after the directory is changed.
Figure 10:
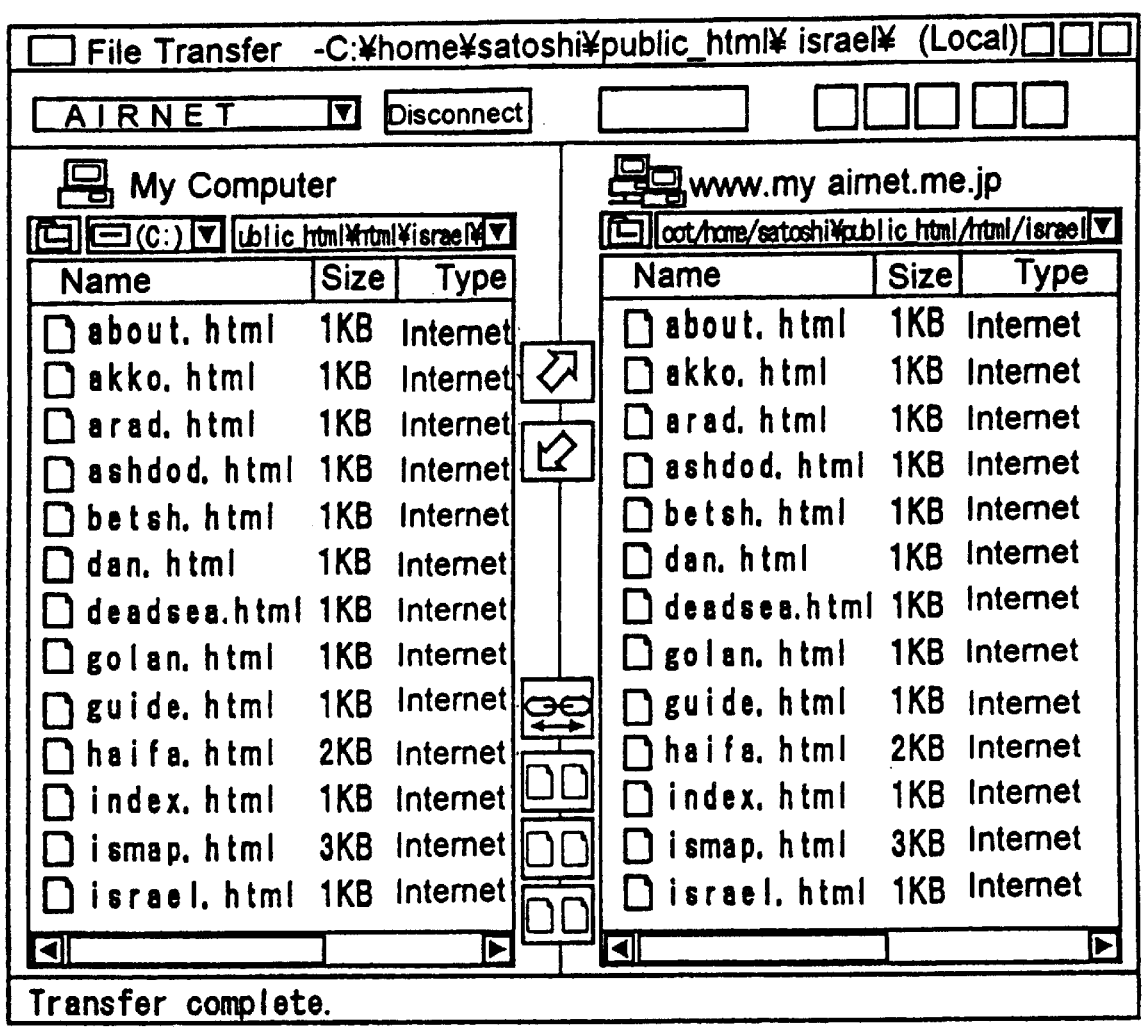
FIG. 10 is a second diagram showing a GUI panel displayed in the monitor (FIG. 2) of the local node after the directory is changed.

FIG. 9 and FIG. 10 are the first and the second diagrams showing a GUI panel displayed in the monitor device 106 (FIG. 2) of the local node 10 after the change of directory.

In step 132 (S132), FTP client software 114 of the local node 10 side displays directory information and file information of the new local current directory and the remote current directory (html) in the windows of the GUI panels of the monitor device 106 in place of directory information and file information of the old local current directory and the remote current directory (public_html).

File Transfer Processing

The user repeats as required the operations so far described to make the current directory of the local node 10 and the remote node 16 an intended directory (israel).

Further, when the user clicks any of the files in the intended directory with a mouse of the input device 108 and either one of the arrow button at the center of the GUI panel, the FTP client software 114 of the local node 10 side performs down load or upload processing of a file (file transfer processing).

Figure 11:
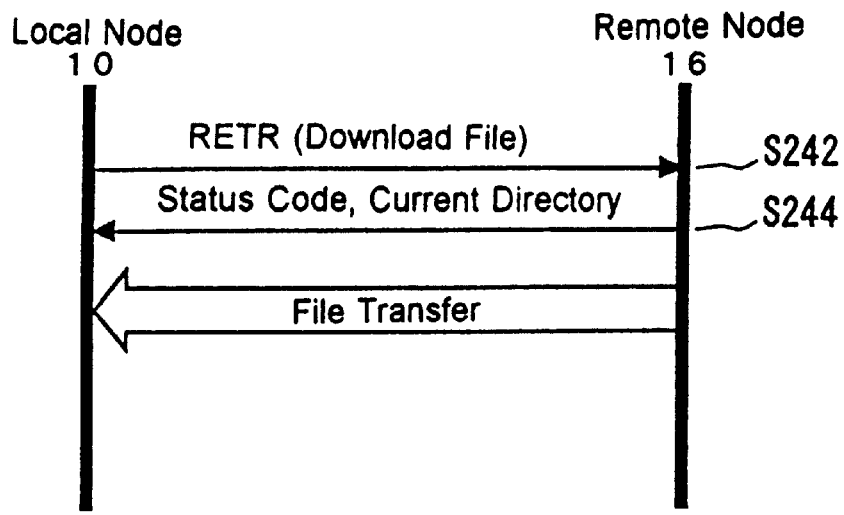
FIG. 11 is a diagram showing a communication sequence of the download processing (S240) in which the local node receives a file transferred from the remote node.

FIG. 11 is a diagram showing a communication sequence of download processing (S240) when the local node 10 receives a file transferred from the remote node 16.

When the user clicks any of the files included in the remote current directory in the left window of the GUI panel and depresses the button of an arrow headed to the right, the FTP client software 114 of the local node 10 side accepts designation of the clicked file (this corresponds to the above described file designation processing) and performs download processing shown in FIG. 11.

As shown in FIG. 11, in step 242 (S242), the FTP client software 114 sends a STOR command including the file name of the file specified by the user to the remote node 16 side.

In step 244 (S244), when the FTP server software 174 of the remote node 16 side receives the STOR command from the local node 10 side, it returns a status code and the remote current directory to the local node 10 side and transfers a file of the file name which is included in the remote current directory and is in the STOR command to the local node 10 side.

The FTP client software 114 of the local node 10 side correlates the file transferred from the remote node 16 to the local current directory and record it in the storage device 110 via the operation system 118.

Figure 12:
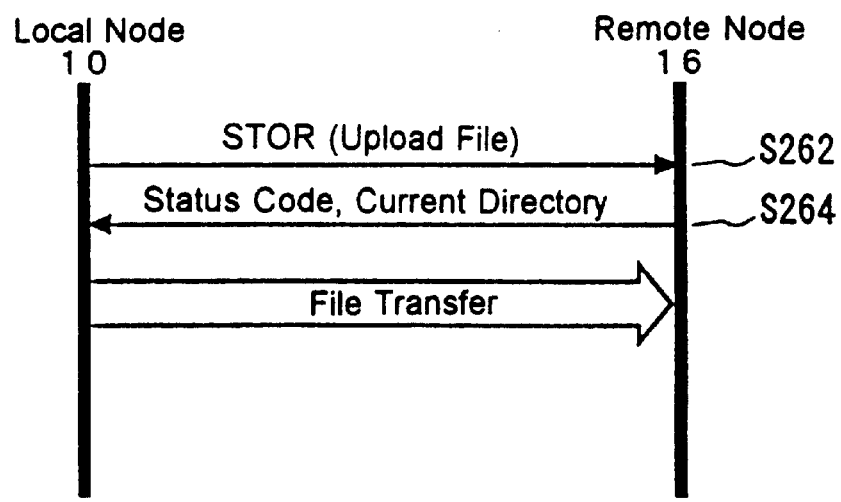
FIG. 12 is a diagram showing a communication sequence (S260) of the upload processing (S240) in which the local node transfers a file to the remote node.

FIG. 12 is a diagram showing a communication sequence (S260) of upload processing where the local node 10 transfers a file to the remote node 16.

For example, when the user clicks any of the files included in the local current directory in the right window of the GUI panel and depresses the left arrow button, the FTP client software 114 of the local node 10 side performs the file designation processing and download processing shown in FIG. 12.

As shown in FIG. 12, in step 262 (S262), the FTP client software 114 sends a RETR command which includes the file name of the file specified by the user to the remote node 16 side.

In step 264 (S244), when the FTP server software 174 in the remote node 16 side receives the RETR command from the local node 10 side, it returns a status code and the remote current directory to the local node 10 side.

When the status code and the remote current directory are returned from the remote node 16 side, the local node 10 in the local node side 10 displays them in the monitor device 106 and further transfers the file of the file name which is included in the local current directory and is in the RETR command to the local node 10 side.

The FTP server software 174 of the remote node 16 side correlates the file transferred from the local node 10 to the remote current directory and stores it in the storage device 110 via the operation system 118.

While the case where a file is transferred between the local node 10 and the remote node 16 was exemplarily shown in the above described embodiment, the file transferring method of this invention may be applied to all possible protocols which enables file transfer between the local node 10 and the remote node 16 by specifying a directory with suitable modification without being limited to the FTP file transfer protocol.

Also, when a directory of the remote node 16 side which does not exist in the local node 10 side is selected, the file transferring method of this invention may be used together with a conventional directory selecting method using a keyboard input.

Also, while the case where the user sequentially selects the lower directories of the current directory was described in the above described embodiment, the user can select higher directories of the current directory by pointing a higher directory displayed in the upper window of the GUI panel so that it can be selected in a similar process to the selection of the lower directories.

Also, while the current directory, the higher directories and the lower directories were all displayed in the GUI panel in the above described embodiment, either the higher directory or the lower directory may be displayed and they can be selected depending on the configuration of the system.

The file transferring method of this invention may be also applicable to file transfer between systems in which a communication net is not intermediated, such as systems in which the local node 10 and the remote node 16 are directly connected each other by a cable without intermediation of the communication device 12 and the data communication net 14 by a suitable modification.

The file transferring method of this invention may be also applicable to file transfer between a data base or a data server and a computer without being limited to file transfer between computers.

As described in the above, according to the file transferring method of this invention, the current directory of the remote node and the current directory of the local node are so modified automatically as to coincide each other simply by users clicking the directory displayed in the window of the GUI panel by a mouse, etc.

Accordingly, the user can easily change a directory with a reduced amount of work. In addition, the user can specify a directory without an error because there is no need to separately input in a keyboard the directory names of the remote node and the local node.

Particularly, when this invention is applied to a work of transferring a file between separate directories for each kind of the file, the work efficiency of the user can be greatly improved while users burden and fatigue are reduced.

In addition, because the file transferring apparatus employing the file transferring method of this invention transfers a file based on a conventional file transfer protocol, it can be easily connected to an existing communication system.

As described in the above, change of the directory of each node is simply performed and users burden is reduced in transferring a file according to the file transferring apparatus and method of this invention.

Further according to the file transferring apparatus and method of this invention, change of the directory of each node required for file transfer can be done by users simple operation of the GUI panel. Further, when the directory of the local node is changed, a directory of the remote node corresponding to the changed directory of the local node can be automatically selected and, conversely, a directory of the local node corresponding to the changed directory of the remote node can be automatically selected when the directory of the remote node is changed.

What is claimed is:

1. A file transferring apparatus for transferring a file containing data across a system of interconnected communication nodes between a local communication node and a remote communication node, comprising:
    first current directory selecting means for selecting either a local current directory or a remote current directory;
    second current directory selecting means responsive to the directory selection of said first current directory selecting means for automatically selecting a remote current directory corresponding to said selected local current directory when said first current directory selecting means selects a local current directory and for automatically selecting a local current directory corresponding to said selected remote current directory when said first current directory selecting means selects a remote current directory; and
    file transfer means for transferring a file correlated to said local current directory to said remote node and/or receiving a file correlated to said remote current directory from said remote node to said local node.

2. A file transferring apparatus in one or more of a plurality of communication nodes interconnected each other (local node) for transferring a file containing data between said local node and another communication node communicating with said local node (remote node), in which each of said communication nodes correlates each of one or more directories configured in a hierarchical structure to at least a directory and/or a file of a lower hierarchy (lower directory), and said remote node at least notifies at least said local node of the directory of said remote node, comprising:
    first current directory selecting means for selecting either one of the directories of said local nodes (local directory) or either one of said notified directories of the remote node (remote directory) as a local current directory or a remote current directory;
    second current directory selecting means for selecting said remote directory corresponding to said selected local current directory or said local directory corresponding to said selected remote directory as said remote current directory or said local current directory;
    file transfer means for transferring a file by sending a file correlated to said local current directory to said remote node and/or receiving a file correlated to said remote current directory from said remote node;
    directory display means for displaying at least said selected local current directory and said selected remote current directory and/or said lower directory and a directory of higher hierarchy (higher directory) of said selected local current directory and said selected remote current directory;
    directory designation accepting means for accepting designation of said lower directory or said higher directory of said local current directory and said remote current directory;
    said first current directory selecting means selecting said lower directory or said higher directory of said local current directory and said remote current directory as a new local current directory and a new remote current directory; and
    said second current directory selecting means selecting said remote current directory or said local current directory corresponding to said newly selected local current directory or said newly selected remote current directory as said new remote current directory or said new local current directory each time said local current directory or said remote current directory is newly selected.

3. A file transferring apparatus of claim 2 in which:
    said remote node notifies upon request said local node of said lower directory and/or said higher directory of said remote current directory;
    said first current directory selecting means and said second current directory selecting means request said remote node to notify of said lower directory and/or said higher directory of said newly selected remote current directory; and
    said directory display means displays said lower directory and/or said higher directory of said selected local current directory and said lower directory and/or said higher directory of said remote current directory notified from said remote node in response to the request.

4. A file transferring apparatus of claim 2 in which:
    at least each of said remote nodes notifies at least said local node of the directory name of said remote directory; and
    said second current directory selecting means selects said remote directory or said local directory of the same directory name as said selected local current directory or said remote current directory as said remote current director or said local current directory.

5. A file transferring method for transferring a file containing data across a plurality of communication nodes interconnected to each other between a local node thereof and a remote node thereof communicating with said local node, comprising the steps of:
    selecting either a local current directory or a remote current directory;
    automatically selecting a remote current directory corresponding to said selected local current directory when a local current directory is selected or automatically selecting a local current directory corresponding to said selected remote current directory when a remote current directory is selected instead; and
    transferring a file correlated to said local current directory to said remote node and/or receiving a file correlated to said remote current directory from said remote node to said local node.

6. A computer readable recording medium for use in a file transferring apparatus for transferring a file containing data across a plurality of communication nodes interconnected to each other between a local node thereof and a remote node thereof communicating with said local node, said recording medium recording a program for causing a computer to execute:

a first current directory selecting step for selecting either a local current directory or a remote current directory;

a second current directory selecting step for automatically selecting a remote current directory corresponding to said selected local current directory when a local current directory is selected in said first current directory selecting step or automatically selecting a local current directory corresponding to said selected remote current directory when a remote current directory is selected in said first current directory selecting step; and a file transfer step for transferring a file correlated to said local current directory to said remote node and/or receiving a file correlated to said remote current directory from said remote node to said local node.

7. A computer readable recording medium for use in a file transferring apparatus for transferring a file containing data between one or more of a plurality of communication nodes interconnected each other (local node) and another communication node communicating with said local node (remote node) in which each of said communication nodes correlates each of one or more directories configured in a hierarchical structure to at least a directory of a lower hierarchy (lower directory) and/or a file, and said remote node at least notifies at least said local node of the directory of said remote node, said recording medium recording a program for causing a computer to execute:

a first current directory selecting step for selecting either one of the directories of said local nodes (local directory) or either one of said notified directories of the remote node (remote directory) as a local current directory or a remote current directory;

a second current directory selecting step for selecting said remote directory corresponding to said selected local current directory or said local directory corresponding to said selected remote directory as said remote current directory or said local current directory;

a file transfer step for transferring a file by sending a file correlated to said local current directory to said remote node and/or receiving a file correlated to said remote current directory from said remote node;

a directory display step for displaying at least said selected local current directory and said selected remote current directory and/or said lower directory and a directory of higher hierarchy (higher directory) of said selected local current directory and said selected remote current directory;

a directory designation accepting step for accepting designation of said lower directory or said higher directory of said local current directory and said remote current directory;

said first current directory selecting step including a step for selecting said lower directory or said higher directory of said local current directory and said remote current directory as a new local current directory and a new remote current directory; and said second current directory selecting step including a step for selecting said remote current directory or said local current directory corresponding to said newly selected local current directory or said newly selected remote current directory as said new remote current directory or said new local current directory each time said local current directory or said remote current directory is newly selected.

8. A computer readable recording medium of claim 7 in which:

said remote node notifies upon request said local node of said lower directory and/or said higher directory of said remote current directory;

said first current directory selecting step and said second current directory selecting step request said remote node to notify of said lower directory and/or said higher directory of said newly selected remote current directory; and said directory display step includes a step for displaying said lower directory and/or said higher directory of said selected local current directory and said lower directory and/or said higher directory of said remote current directory notified from said remote node in response to the request.

9. A computer readable recording medium of claim 7 in which:

at least each of said remote nodes notifies at least said local node of the directory name of said remote directory; and said second current directory selecting step includes a step for selecting said remote directory or said local directory of the same directory name as said selected local current directory or said remote current directory as said remote current director or said local current directory.

* * * * *